(12) United States Patent
Frohreich et al.

(10) Patent No.: US 10,989,052 B2
(45) Date of Patent: Apr. 27, 2021

(54) APPARATUS AND METHOD FOR A DUAL POWER SYSTEM

(71) Applicant: Kolberg-Pioneer, Inc., Yankton, SD (US)

(72) Inventors: Robert Herman Frohreich, Yankton, SD (US); Christopher Bradley Gukeisen, Yankton, SD (US); Stephen Alexander Whyte, Yankton, SD (US)

(73) Assignee: Kolberg-Pioneer, Inc., Yankton, SD (US)

( * ) Notice: Subject to any disclaimer, the term of this patent is extended or adjusted under 35 U.S.C. 154(b) by 0 days.

(21) Appl. No.: 15/895,372

(22) Filed: Feb. 13, 2018

(65) Prior Publication Data
US 2018/0230802 A1    Aug. 16, 2018

Related U.S. Application Data

(60) Provisional application No. 62/458,686, filed on Feb. 14, 2017.

(51) Int. Cl.
| | |
|---|---|
| *E02F 9/08* | (2006.01) |
| *F01B 23/12* | (2006.01) |
| *B60W 20/00* | (2016.01) |
| *B60K 6/00* | (2006.01) |
| *B02C 21/02* | (2006.01) |
| *B60K 6/12* | (2006.01) |
| *F02B 63/06* | (2006.01) |

(52) U.S. Cl.
CPC ............. *F01B 23/12* (2013.01); *B60K 6/00* (2013.01); *B60W 20/00* (2013.01); *B02C 21/026* (2013.01); *B60K 2006/123* (2013.01); *E02F 9/0866* (2013.01); *F02B 63/06* (2013.01)

(58) Field of Classification Search
CPC ............. F15B 2211/20515; F15B 2211/20523
See application file for complete search history.

(56) References Cited

U.S. PATENT DOCUMENTS

| | | | | |
|---|---|---|---|---|
| 7,047,931 B2* | 5/2006 | Sluka | ...................... | F01L 1/344 |
| | | | | 123/196 R |
| 7,086,226 B2* | 8/2006 | Oguri | .................... | E02F 9/2075 |
| | | | | 60/414 |
| 7,559,401 B2* | 7/2009 | Binev | ..................... | B60T 1/093 |
| | | | | 180/305 |
| 7,565,801 B2* | 7/2009 | Tozawa | ................. | E02F 9/2075 |
| | | | | 60/414 |
| 8,200,400 B2* | 6/2012 | Filla | ........................ | B60K 6/48 |
| | | | | 701/50 |
| 8,607,558 B2* | 12/2013 | Kawaguchi | ........... | E02F 9/2075 |
| | | | | 60/431 |

(Continued)

*Primary Examiner* — Thomas E Lazo
(74) *Attorney, Agent, or Firm* — Chambliss, Bahner & Stophel, P.C.

(57) ABSTRACT

A power system including a pump drive having a first side and a second side, a motor that is operationally connected to the first side of the pump drive, an engine that is operationally connected to the second side of the pump drive, and a pump that is operationally connected to the pump drive. The preferred power system is adapted to power the item of equipment with either the motor or the engine. A method for providing power to an item of equipment by engaging the pump drive with the engine and/or the motor.

16 Claims, 7 Drawing Sheets

(56) References Cited

U.S. PATENT DOCUMENTS

| | | | | |
|---|---|---|---|---|
| 8,943,820 B2* | 2/2015 | Carlton | ............... | B60W 10/06 |
| | | | | 60/431 |
| 8,991,184 B2* | 3/2015 | Ooki | ................. | E02F 9/123 |
| | | | | 60/711 |
| 9,013,050 B2* | 4/2015 | Yamashita | ............... | H02P 9/00 |
| | | | | 290/40 R |
| 9,032,726 B2* | 5/2015 | Sora | ................. | E02F 9/2235 |
| | | | | 60/431 |
| 9,038,375 B2* | 5/2015 | Iwasaki | ............... | B60K 6/485 |
| | | | | 60/295 |
| 9,109,586 B2* | 8/2015 | Yamada | ............... | B60K 6/20 |
| 9,637,890 B2* | 5/2017 | Hirozawa | ............. | B60K 6/387 |
| 9,702,379 B2* | 7/2017 | Takahashi | ............... | F15B 11/16 |
| 2006/0054445 A1* | 3/2006 | Pashnik | ............... | B60K 6/40 |
| | | | | 192/113.1 |
| 2013/0180247 A1* | 7/2013 | Yamada | ............... | B60K 6/20 |
| | | | | 60/706 |
| 2014/0000252 A1* | 1/2014 | Sora | ................. | E02F 9/2066 |
| | | | | 60/431 |
| 2014/0020375 A1* | 1/2014 | Fujishima | ............ | B60W 20/00 |
| | | | | 60/431 |

* cited by examiner

APPARATUS AND METHOD FOR A DUAL POWER SYSTEM

CROSS-REFERENCES TO RELATED APPLICATIONS/PATENTS

This application relates back to and claims the benefit of priority from U.S. Provisional Application for Patent Ser. No. 62/458,686 titled "Dual Power System" and filed on Feb. 14, 2017.

FIELD OF THE INVENTION

The present invention relates generally to apparatuses and methods for power systems, and particularly to apparatuses and methods for dual power systems for rock crushers and screens.

BACKGROUND AND DESCRIPTION OF THE PRIOR ART

It is known to use apparatuses and methods to produce power for items of heavy equipment. Conventional apparatuses and methods, however, suffer from one or more disadvantages. For example, conventional apparatuses and methods do not easily vary the speed at which the equipment operates. Conventional apparatuses and methods also do not easily reverse the operating direction of the item of heavy equipment. Further, conventional apparatuses and methods require an onboard engine that must be running in order for the equipment to operate. Still further, conventional apparatuses and methods require undesirably large engines which are expensive and result in difficulties obtaining permits to operate. In addition, conventional apparatuses and methods are undesirably bulky and expensive to operate. Conventional apparatuses and methods are also undesirably susceptible to power loss at elevations and blockage in dusty or dirty conditions.

It would be desirable, therefore, if an apparatus and method for a power system could be provided that would easily vary the operating speed of an item of heavy equipment. It would also be desirable if such an apparatus and method for a power system could be provided that would easily reverse the operating direction of an item of heavy equipment. It would be further desirable if such an apparatus and method for a power system could be provided that would not require an onboard running engine in order for the item of heavy equipment to operate. It would be still further desirable if such an apparatus and method for a power system could be provided that would have a smaller, less expensive engine. In addition, it would be desirable if such an apparatus and method for a power system could be provided that would be less bulky and less expensive to operate. It would also be desirable if such an apparatus and method for a power system could be provided that would be less susceptible to power loss at elevations and less susceptible to blockage in dusty or dirty conditions.

Advantages of the Preferred Embodiments of the Invention

Accordingly, it is an advantage of the preferred embodiments of the invention claimed herein to provide an apparatus and method for a power system that easily varies the operating speed of an item of heavy equipment. It is also an advantage of the preferred embodiments of the invention claimed herein to provide an apparatus and method for a power system that easily reverses the operating direction of an item of heavy equipment. It is another advantage of the preferred embodiments of the invention claimed herein to provide an apparatus and method for a power system that does not require an onboard running engine in order for the item of heavy equipment to operate. It is still another advantage of the preferred embodiments of the invention claimed herein to provide an apparatus and method for a power system that has a smaller, less expensive engine. It is yet another advantage of the preferred embodiments of the invention claimed herein to provide an apparatus and method for a power system that is compact and less expensive to operate. In addition, is an advantage of the preferred embodiments of the invention claimed herein to provide an apparatus and method for a power system that is less susceptible to power loss at elevations and less susceptible to blockage in dusty or dirty conditions.

Additional advantages of the preferred embodiments of the invention will become apparent from an examination of the drawings and the ensuing description.

Explanation of the Technical Terms

As used herein, the term "clutch" means a device, mechanism, assembly, or combination thereof adapted to engage and disengage power transmission. The term "clutch" includes without limitation friction clutches, electromagnetic clutches, electronic clutches, hydraulic clutches, pneumatic clutches, multiple plate clutches, centrifugal clutches, cone clutches, safety clutches, non-slip clutches, belt clutches, dog clutches, overrunning clutches, wrap-spring clutches, single-revolution clutches, kickback clutches, and lock-up clutches.

As used herein, the term "engine" means a device, mechanism, assembly, or combination thereof adapted convert thermal energy into mechanical energy. The term "engine" includes without limitation heat-type engines, combustion engines (internal, external, and air-breathing), and non-combusting heat engines.

As used herein, the term "motor" means a device, mechanism, assembly, or combination thereof adapted to convert electrical energy into mechanical energy using forces exerted by magnetic fields on current-carrying circuits. The term "motor" includes without limitation self-commutated motors, brushed DC motors, electronic commutator motors, universal AC-DC motors, externally commutated motors, induction motors synchronous motors, doubly-fed electric motors, magnetic motors, rotary motors, and linear motors.

As used herein, the term "pump" means a device, mechanism, assembly, or combination thereof adapted to convert mechanical energy into fluid energy by any of a variety of technologies, including without limitation, suction or compression, in order to move fluid into, through, and/or out of a system. The term "pump" includes without limitation positive displacement pumps (rotary-type, reciprocating-type, and linear-type), gear pumps, screw pumps, rotary vane pumps, plunger pumps, diaphragm pumps, piston pumps, radial piston pumps, rotary lobe pumps, progressive cavity pumps, rotary gear pumps, progressing cavity pumps, roots-type pumps, peristaltic pumps, double-diaphragm pumps, rope pumps, impulse pumps, ram pumps, pulsar pumps, airlift pumps, velocity pumps, radial-flow pumps, axial-flow pumps, educator-jet pumps, gravity pumps, steam pumps, and valveless pumps.

As used herein, the terms "pump drive" means a device, mechanism, assembly, or combination thereof adapted to drive a pump using one or more gears.

SUMMARY OF THE INVENTION

The apparatus of the invention comprises a power system including a pump drive having a first side and a second side, a motor that is operationally connected to the first side of the pump drive, an engine that is operationally connected to the second side of the pump drive, and a pump that is operationally connected to the pump drive. The preferred power system is adapted to power the item of equipment with either the motor or the engine.

The method of the invention comprises a method for providing power to an item of equipment. The preferred method comprises providing a power system adapted to power an item of equipment. The preferred power system comprises a pump drive having a first side and a second side, a motor that is operationally connected to the first side of the pump drive, an engine that is operationally connected to the second side of the pump drive, and a pump that is operationally connected to the pump drive. The preferred power system is adapted to power the item of equipment with either the motor or the engine. The preferred method further comprises engaging the pump drive with the motor and/or the engine.

BRIEF DESCRIPTION OF THE DRAWINGS

The presently preferred embodiments of the invention are illustrated in the accompanying drawings, in which like reference numerals represent like parts throughout, and in which.

DESCRIPTION OF THE PREFERRED EMBODIMENTS OF THE INVENTION

Figure 1:
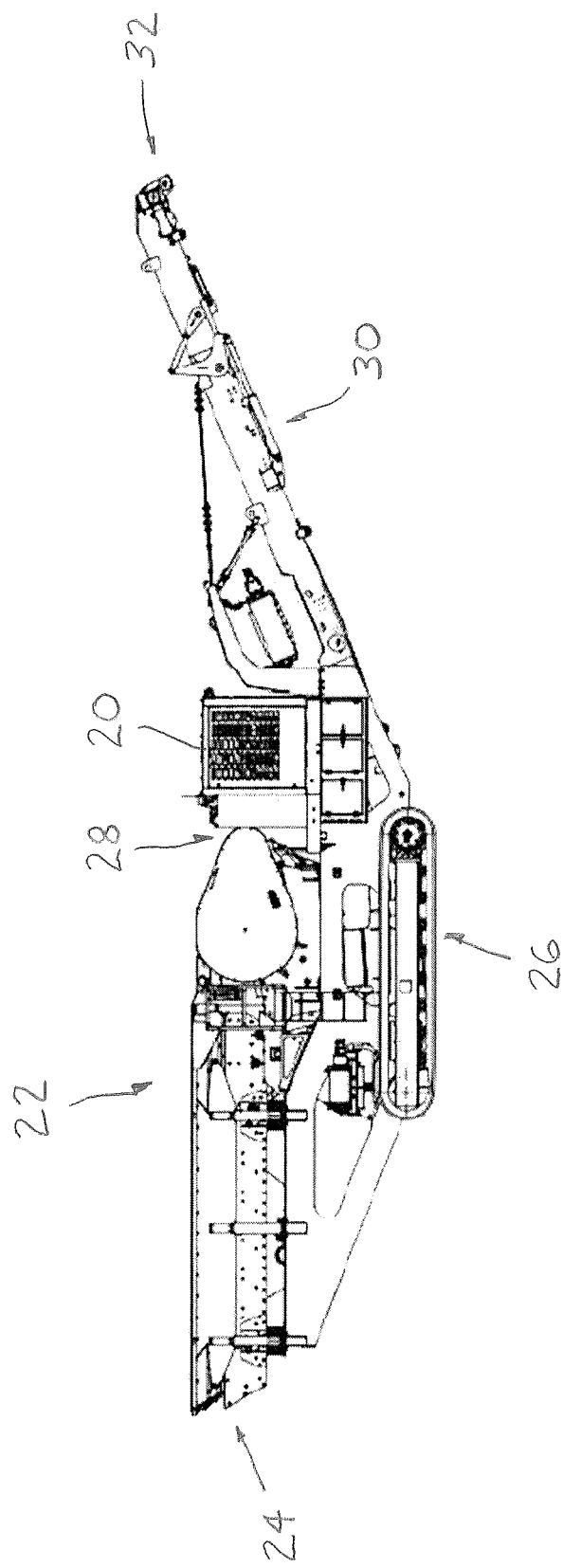
FIG. 1 is a right side view of the preferred embodiment of the power system in accordance with the present invention shown on an exemplary item of equipment.

Referring now to the drawings, the preferred s of the power system in accordance with the present invention are illustrated by FIGS. 1 through 6. As shown in FIGS. 1-6, the preferred power system is adapted to easily vary the operating speed and easily reverse the operating direction of an item of heavy equipment. The preferred power system also does not require an onboard running engine in order for the item of heavy equipment to operate and has a smaller, less expensive engine. The preferred power system is also compact and less expensive to operate. In addition, the preferred power system is less susceptible to power loss at elevations and less susceptible to blockage in dusty or dirty conditions.

Referring now to FIG. 1, a right side view of the preferred embodiment of the power system in accordance with the present invention shown on an exemplary item of equipment is illustrated. As shown in FIG. 1, the preferred power system is designated generally by reference numeral 20. Preferred power system 20 is mounted to exemplary item of equipment 22 and adapted to power the item of equipment. Exemplary item of equipment 22 has feeder end 24 which includes a feeder drive. Exemplary item of equipment 22 also comprises track drive 26, crusher drive 28, and conveyor drive 30 at conveyor end 32. Preferably, each of the drives are hydraulic drives, but it is contemplated within the scope of the invention that one or more of the drives may be pneumatic, electrical, mechanical, or any other suitable type of drive. While FIG. 1 illustrates the preferred power system mounted on the exemplary item of equipment, it is also contemplated within the scope of the invention that the power system may not be mounted on an item of equipment and instead placed at a location remote from the item of equipment.

Figure 2:
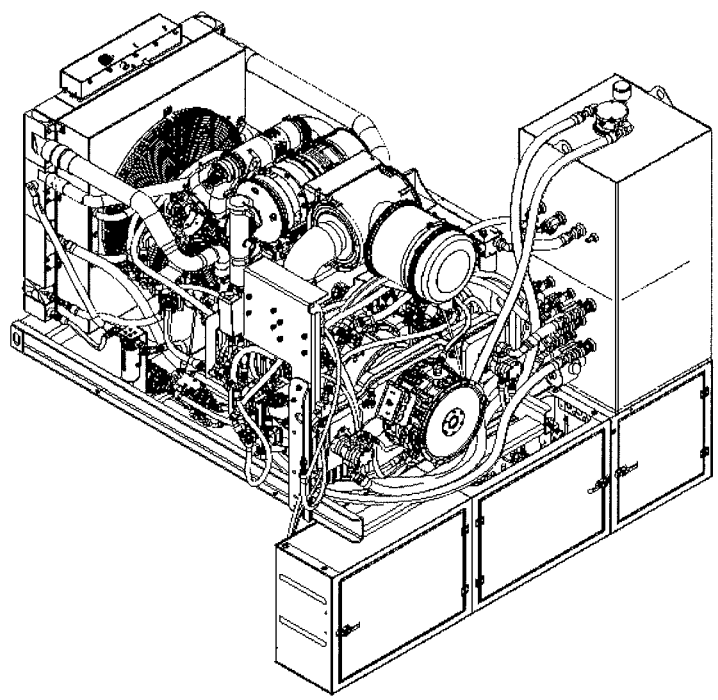
FIG. 2 is a perspective view of the preferred power system illustrated in FIG. 1.

Referring now to FIG. 2, a perspective view of power system 20 is illustrated. As shown in FIG. 2, preferred power system 20 comprises pump drive 40, motor 42, engine 44, and pump 46. Preferred pump drive 40 is a hydraulic pump drive and comprises one or more gears. Preferred motor 42 is an electric motor or a high definition electric motor and it is contemplated within the scope of the invention that preferred power system 20 may comprise more than one motor. The preferred engine 44 is a diesel engine and is operationally connected to the pump drive via clutch 48. Preferred clutch 48 is an electronic clutch. Preferred pump 46 is a hydraulic pump that is mounted on pump drive 40. It is contemplated within the scope of the invention that preferred power system 20 may comprise more than one pump.

Figure 3:
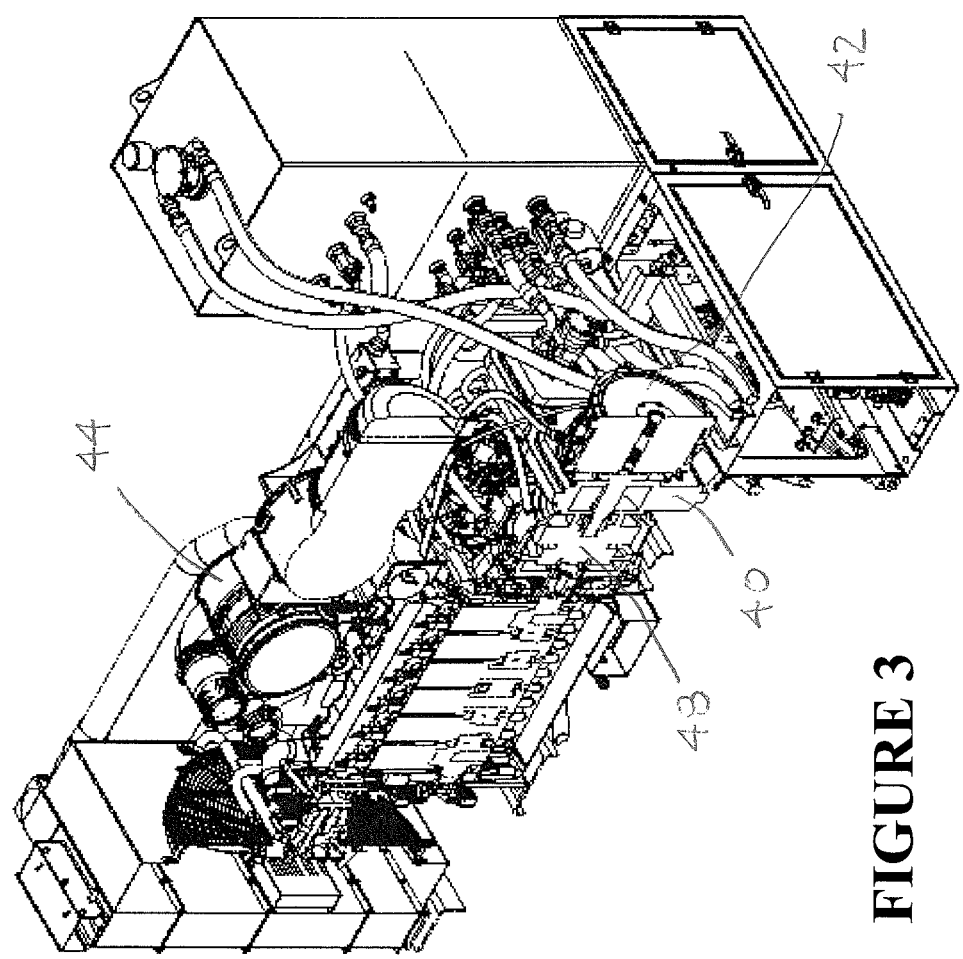
FIG. 3 is a sectional perspective view of the preferred power system illustrated in FIGS. 1-2.

Referring now to FIG. 3, a sectional perspective view of preferred power system 20 is illustrated. As shown in FIG. 3, preferred power system 20 comprises pump drive 40, motor 42, engine 44, and pump 46.

Figure 3A:
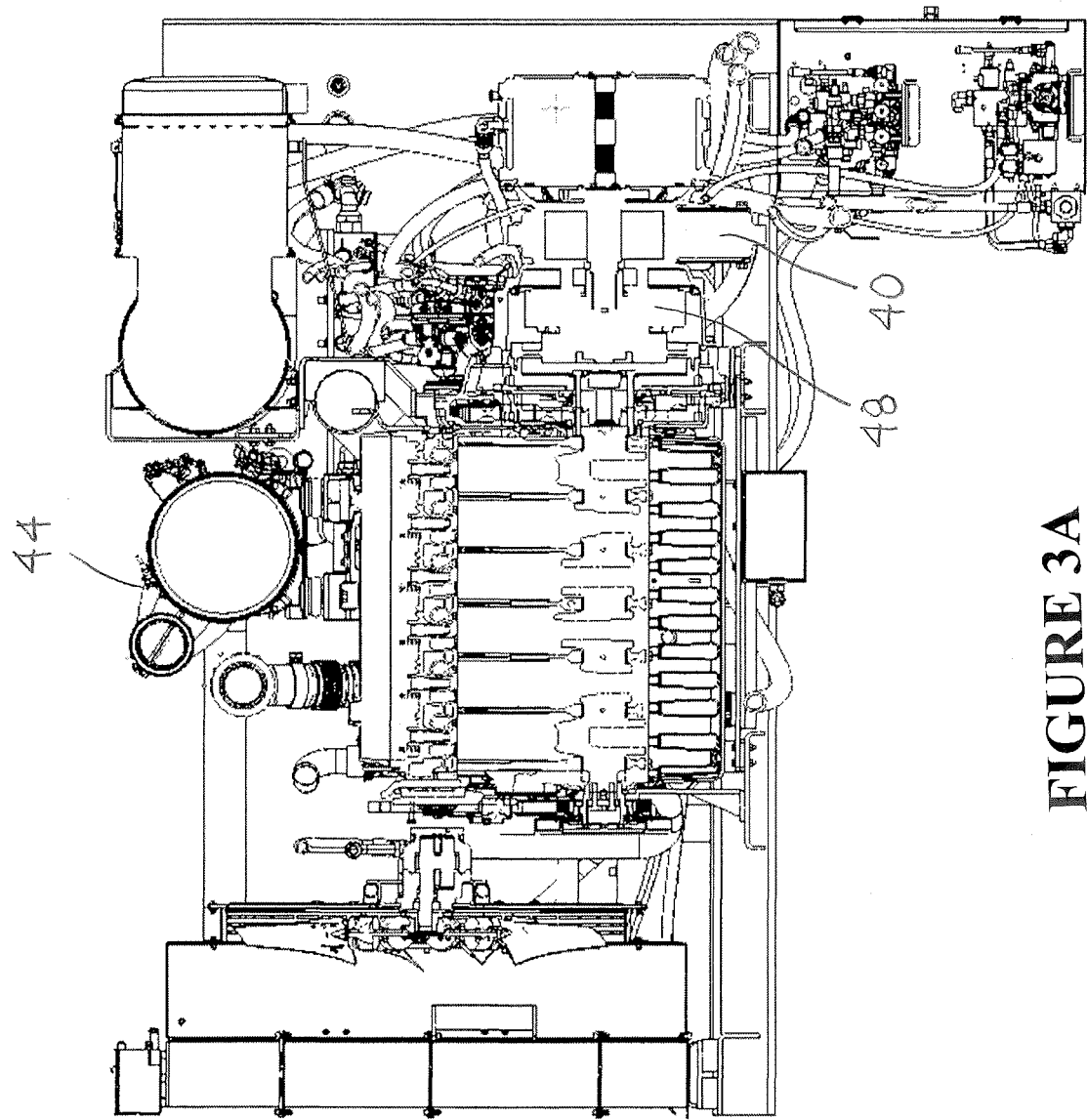
FIG. 3A is a sectional front view of the preferred embodiment of the power system illustrated in FIGS. 1-3.

Referring to FIG. 3A, a sectional front view of preferred power system 20 is illustrated. As shown in FIG. 3A, preferred power system 20 comprises pump drive 40, engine 44, and clutch 48.

Figure 4:
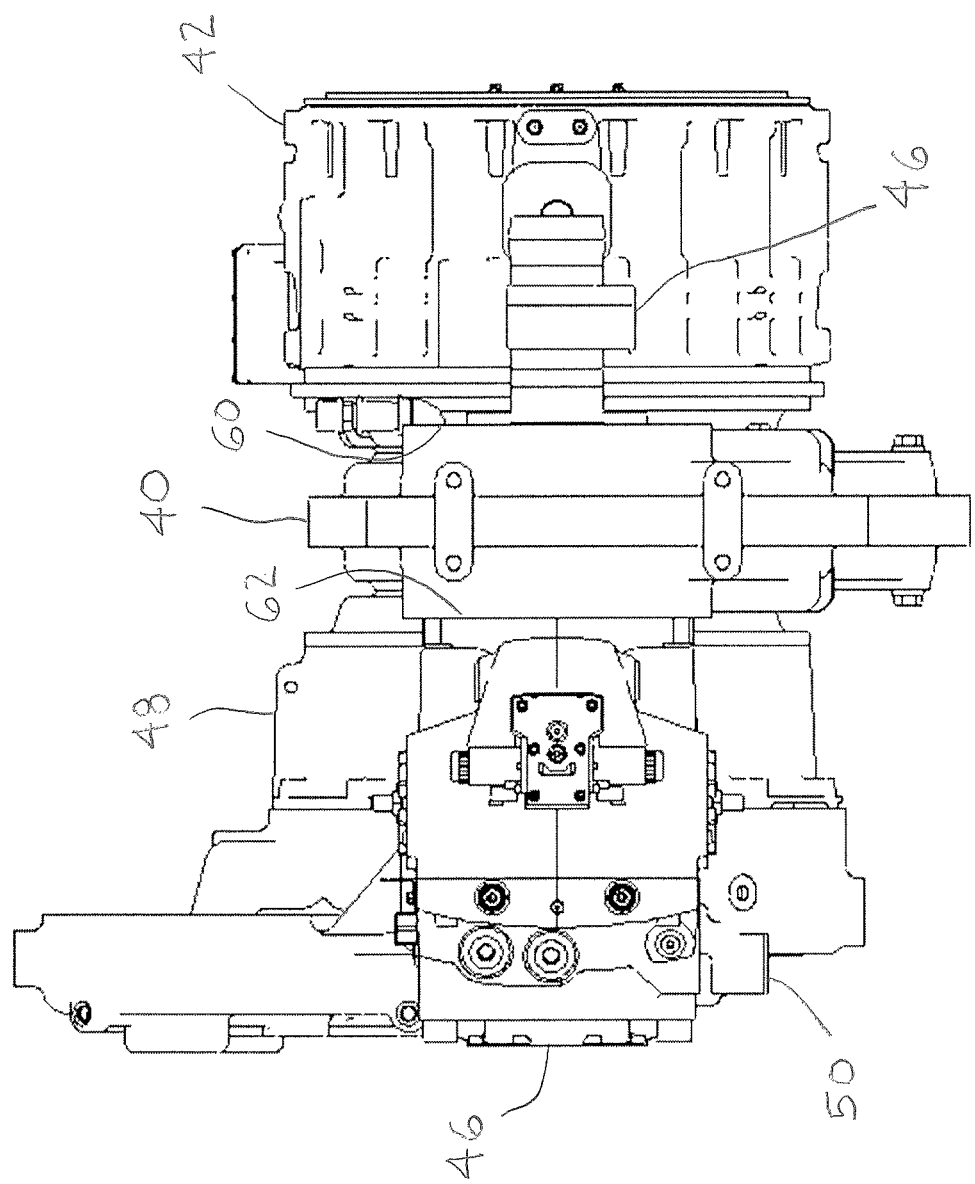
FIG. 4 is a front view of a portion of the preferred power system illustrated in FIGS. 1-3A.

Referring now to FIG. 4, a front view of a portion of preferred power system 20 is illustrated. As shown in FIG. 4, preferred power system 20 comprises pump drive 40, motor 42, pumps 46, clutch 48, and flywheel housing 50. Preferred pump drive 40 has first side 60 and second side 62. Preferred motor 42 is operationally connected to first side 60 of pump drive 40 and preferred engine 44 is operationally connected to second side 62 of pump drive 40. Preferably, engine 44 is operationally connected to second side 62 of pump drive 40 via clutch 48. Preferred pumps 46 are operationally connected to pump drive 40.

Figure 5:
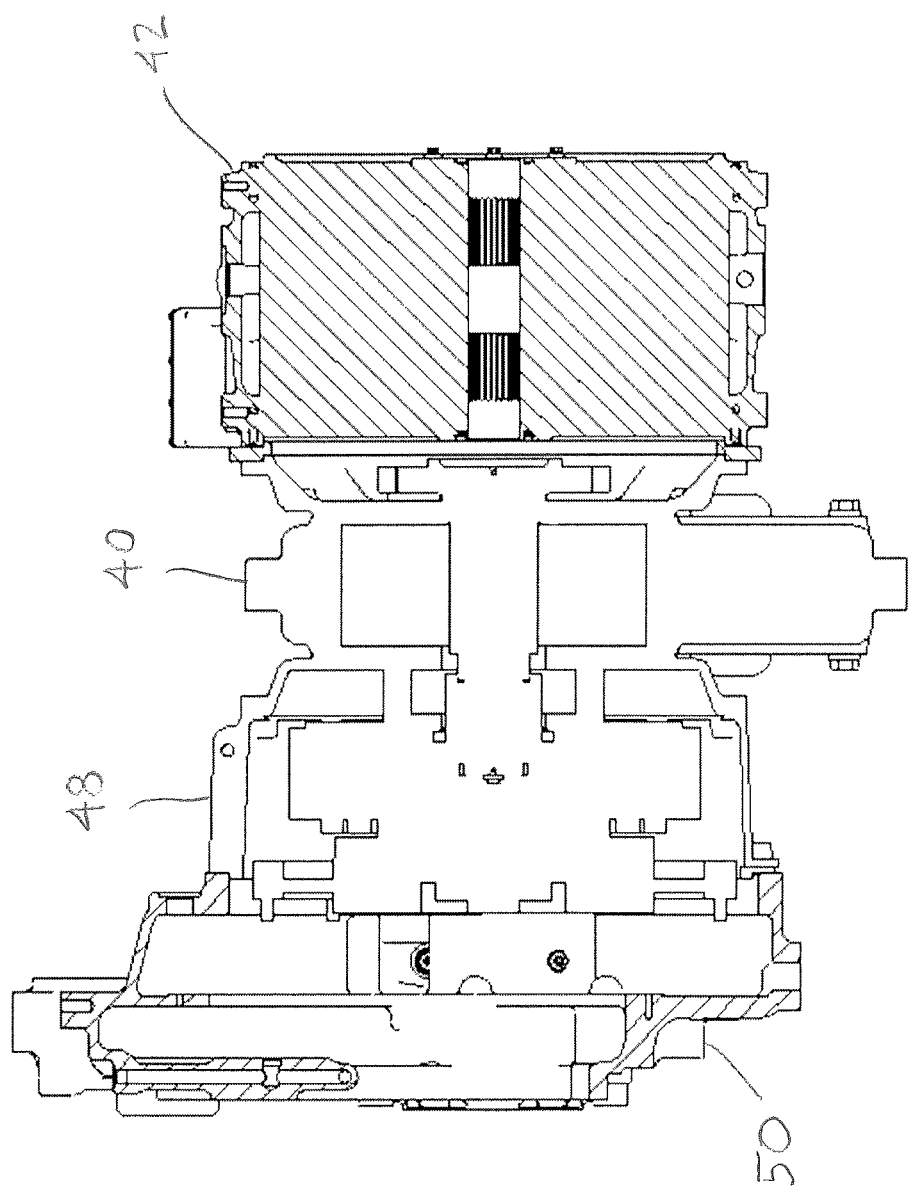
FIG. 5 is a sectional front view of a portion of the preferred power system illustrated in FIGS. 1-4.

Referring now to FIG. 5, a sectional front view of a portion of preferred power system 20 is illustrated. As shown in FIG. 5, preferred power system 20 comprises pump drive 40, motor 42, clutch 48, and flywheel housing 50.

Figure 6:
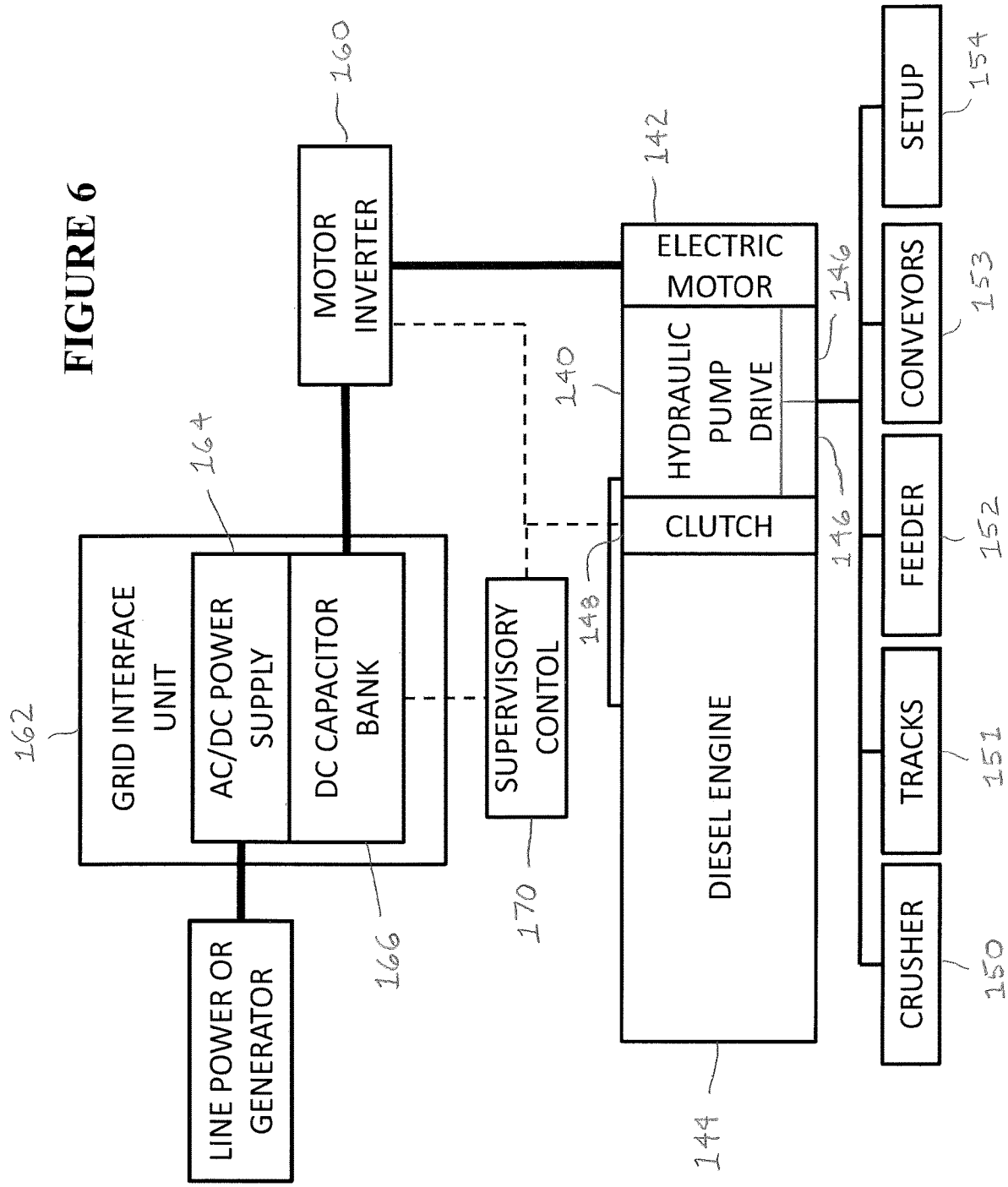
FIG. 6 is a schematic view of an exemplary plant including the preferred power system illustrated in FIGS. 1-5.

Referring now to FIG. 6, a schematic view of an exemplary plant including the preferred power system is illustrated. As shown in FIG. 6, preferred power system is designated generally by reference numeral 120. Preferred power system 120 comprises pump drive 140, motor 142, engine 144, pumps 146, and clutch 148. Preferred pump drive 140 is operationally connected to pumps 146 which are operationally connected to items of equipment such as crusher 150, tracks 151, feeder 152, conveyors 153, and setup 154.

Still referring to FIG. 6, preferred motor 142 is operationally connected to motor invertor 160 which is operationally connected to grid interface unit 162. Preferred grid interface unit 162 includes AC/DC power supply 164 which is adapted to supply electrical energy from either line power or a generator (genset) or a combination thereof. Preferred grid interface unit 162 also includes DC capacitor 166 which has the ability to store electrical energy and block the flow of direct current. The exemplary plant also includes control center 170 which is adapted to control power system 120, motor inverter 160, and grid interface unit 162.

The claimed invention also comprises a method for providing power to an item of equipment. The preferred method comprises providing a power system adapted to power an item of equipment. The preferred power system comprises a pump drive having a first side and a second side, a motor that is operationally connected to the first side of the pump drive, an engine that is operationally connected to the second side of the pump drive, and a pump that is operationally connected to the pump drive. The preferred power system is adapted to power the item of equipment with either the motor or the engine. The preferred method further comprises engaging the pump drive with the motor and/or the engine. In another preferred embodiment of the method for providing power to an item of equipment, only the motor engages the pump drive when the item of equipment is fully operational.

In operation, several advantages of the preferred embodiments of the power system are achieved. For example, the preferred embodiments of the power system easily varies the operating speed and easily reverses the operating direction of an item of heavy equipment. The preferred power system also does not require an onboard running engine in order for the item of heavy equipment to operate. The preferred power system is also less expensive to operate. In addition, the preferred power system is less susceptible to power loss at elevations and less susceptible to blockage in dusty or dirty conditions.

The preferred pump drive is a gearbox having mounting pads for mounting the hydraulic pumps. Preferably, the pump drive has two inputs. One input is the diesel engine and the other input is the electric motor. The outputs of the pump drive are located where the hydraulic pumps are mounted. The hydraulic pumps are driven by the pump drive, and the hydraulic pumps pump oil to the hydraulic motor(s) on the item of equipment.

Preferably, when the diesel engine is used as the power source, the electric motor spins, but does not provide any power to the pump drive. When the electric motor is used as the power source, the diesel engine is disconnected from the pump drive via the clutch not being engaged. In this condition, all of the power comes from the electric motor to drive the hydraulic pumps through the pump drive. The diesel engine and the electric motor may also run simultaneously. In this condition, the electric motor can function as a genset and potentially produce excess energy that can be stored in a battery or a battery pack for spikes in the power requirement and/or to power additional power systems and/or items of equipment on site.

Although this description contains many specifics, these should not be construed as limiting the scope of the invention but as merely providing illustrations of some of the presently preferred embodiments thereof, as well as the best mode contemplated by the inventors of carrying out the invention. The invention, as described herein, is susceptible to various modifications and adaptations, and the same are intended to be comprehended within the meaning and range of equivalents of the appended claims.

What is claimed is:

1. A dual power system adapted to power an item of equipment, said dual power system comprising:
   (a) a pump drive; said pump drive having a gear, a first side, and a second side;
   (b) a dedicated motor, said motor being operationally connected to the first side of the pump drive and said motor receiving power from a power line or genset;
   (c) a dedicated engine, said engine being operationally connected to the second side of the pump drive;
   (d) a pump, said pump being operationally connected to the pump drive;
   (e) a clutch, said clutch operationally connecting the engine to the second side of the pump drive;
   wherein the dual power system is adapted to power the item of equipment with only one of the motor and the engine but not by both the motor and the engine simultaneously; and wherein the dual power system is adapted to power the item of equipment without the engine running; and wherein the gear is adapted to control the pump; and wherein the engine drives the pump drive when the clutch is engaged; and wherein the motor drives the pump drive when the clutch is disengaged; and wherein the clutch prevents the engine and the motor from simultaneously driving the pump drive.

2. The power system of claim 1 wherein the pump drive comprises a hydraulic pump drive.

3. The power system of claim 1 wherein the motor comprises an electric motor.

4. The power system of claim 1 wherein the motor comprises a high definition electric motor.

5. The power system of claim 1 wherein the engine comprises a diesel engine.

6. The power system of claim 1 wherein the clutch comprises an electronic clutch.

7. The power system of claim 1 wherein the pump comprises a hydraulic pump.

8. The power system of claim 1 wherein the power system comprises a flywheel.

9. A method for providing power to an item of equipment, said method comprising:
   (a) providing a dual power system adapted to power an item of equipment, said dual power system comprising:
      (i) a pump drive; said pump drive having a gear, a first side, and a second side;
      (ii) a dedicated motor, said motor being operationally connected to the first side of the pump drive and said motor receiving power from a power line or a genset;
      (iii) a dedicated engine, said engine being operationally connected to the second side of the pump drive;
      (iv) a pump, said pump being in fluid communication with the pump drive;
      (v) a clutch, said clutch operationally connecting the engine to the second side of the pump drive;
      wherein the dual power system is adapted to power the item of equipment with only one of the motor and the engine but not by both the motor and the engine simultaneously; and wherein the dual power system is adapted to power the item of equipment without the engine running; and wherein the gear is adapted to control the pump; and wherein the engine drives the pump drive when the clutch is engaged; and wherein the motor drives the pump drive when the clutch is disengaged; and wherein the clutch prevents the engine and the motor from simultaneously driving the pump drive;
(b) engaging the pump drive with only one of the motor and the engine.

10. The method of claim 9 wherein the item of equipment is fully operational when only the motor engages the pump drive.

11. The method of claim 9 wherein the motor comprises an electric motor.

12. The method of claim 9 wherein the engine comprises a diesel engine.

13. The method of claim 9 wherein the clutch is an electronic clutch.

14. The method of claim 9 wherein the pump comprises a hydraulic pump.

15. The method of claim 9 wherein the power system comprises a plurality of hydraulic pumps.

16. The method of claim 9 wherein the power system comprises a flywheel.

* * * * *